United States Patent [19]

Dlubala

[11] Patent Number: 4,523,768

[45] Date of Patent: Jun. 18, 1985

[54] COLLAPSIBLE CART-STAND

[76] Inventor: Joseph C. Dlubala, 38115 Alcoy Dr., Sterling Heights, Mich. 48077

[21] Appl. No.: 551,679

[22] Filed: Nov. 14, 1983

[51] Int. Cl.³ ............................................. B62B 3/02
[52] U.S. Cl. ..................................... 280/42; 280/651; 280/79.1 R; 211/195; 211/201
[58] Field of Search ................. 280/651, 652, 639, 35, 280/42, 30, 79.3, 79.1 R, 659, 47.35, 33.99 R, 33.99 H, 33.99 A; 108/55.1, 56.3; 211/195, 201

[56] References Cited

U.S. PATENT DOCUMENTS

| | | | |
|---|---|---|---|
| 1,912,864 | 6/1933 | Stannard | 280/79.3 |
| 2,174,870 | 10/1939 | Daniels | 280/651 |
| 3,265,297 | 8/1966 | Behrens | 280/33.99 A |
| 3,840,243 | 10/1974 | Rheinhart | 280/651 |

FOREIGN PATENT DOCUMENTS

1P33057 11/1968 United Kingdom .................. 280/42

*Primary Examiner*—Joseph F. Peters, Jr.
*Assistant Examiner*—Everett G. Diederiks, Jr.
*Attorney, Agent, or Firm*—Cullen, Sloman, Cantor, Grauer, Scott & Rutherford

[57] ABSTRACT

A collapsible cart-stand, convertible to a bandstand comprises a pair of upright parallel spaced frames mounting casters, with spaced pairs of foldable support links at their free ends pivotally connected to lower ends of the side frames. A platform spans a support rod on each side frame and is removably secured thereto. A pair of spaced anchor links at their one ends are pivotally connected to upper end portions of one side frame and at their other ends adjustably connected to upper end portions of the other side frame. The frames, on removal of the platform and adjusting the other ends of the anchor links, are adapted for collapsing into parallel engaging registry. The platform being alternately mountable upon top rods of the side frames and secured thereto. With a change in the connections of the anchor links to the other side frame the platform is inclined forwardly and downwardly.

5 Claims, 5 Drawing Figures

COLLAPSIBLE CART-STAND

BACKGROUND OF THE INVENTION

Heretofore, various types of collapsible carts on casters have been provided including a platform for supporting articles. The difficulty with carts in the prior art is that some are hard to assemble and fold and collapse as desired for storage.

THE PRIOR ART

Illustrative of collapsible carts on casters generally are one or more of the following United States Patents:

| U.S. PAT. NO. | NAME | DATE |
| --- | --- | --- |
| 1,963,594 | E. J. Schwabe | June 19, 1934 |
| 2,841,407 | V. P. Arnao | July 1, 1958 |
| 3,436,092 | U. Werner | April 1, 1969 |
| 3,527,174 | Ralph B. Lay | September 8, 1970 |
| 3,827,573 | Marcel Guerette | August 6, 1974 |
| 3,840,243 | Vance E. Rheinhart | October 8, 1974 |
| 2,089,436 | E. J. Schwabe | August 10, 1937 |

SUMMARY OF THE INVENTION

An important feature of the present invention is to provide an improved collapsible cart-stand including a pair of parallel spaced side frames mounting casters at the lower ends and interconnected at their opposite ends by upper and lower pivotal linkages and with a platform mounted upon and spanning lower end portions of the respective frames and secured thereto.

Another feature is to provide a collapsible cart-stand including a pair of spaced upright side frames with longitudinally spaced pairs of aligned foldable frame support links at their inner ends pivotally connected and at their outer ends pivotally connected to lower end portions of the side frames and extending transversely thereof. A pair of longitudinally spaced anchor links at their one ends are pivotally connected to upper end portions of one side frame and at their other ends removably connected to upper end portions of the other side frame and extending transversely thereof, whereby on disconnection of the other ends of the anchor links, the side frames are adapted for collapsing into parallel engaging registry.

Another feature includes upon each side frame a bottom support rod and wherein the platform spans the side frames and overlies and is removably secured to said support rods.

An important feature includes, when the cart-stand is collapsed, the platform is adapted for snug upright positioning between the side frames and removably secured thereto.

A further feature includes for each of the side frames, inclined reinforcing rods to which the platform is removably secured when the cart-stand has been collapsed.

An important object of the present invention is to provide upon the undersurface of the platform spaced opposed pairs of clips adapted for removably securing with the corresponding support rods of the side frames.

Another feature includes in connection with the anchor links a reinforcement link at one end pivotally connected to an anchor link intermediate its ends, and at it other end removably secured to an intermediate connection on the adjacent side frame between its connections with the support and anchor links, and wherein upon removal of the other ends of the anchor links and the other ends of the reinforcement links from said intermediate connection and reconnecting the other ends of the anchor links to the intermediate connection and with portions of the reinforcement links connected to the other side frames respectively, the adjacent side frame is inclined at an acute angle to said one side frame and the platform is removably positioned upon support rods at the tops of the respective side frames and removably and secured thereto, providing a bandstand, a drafting board or like object.

An important feature is the provision of the opposed pair of side frames mounting a support platform and in conjunction with vertically spaced opposed pairs of support links and anchor links to retainingly enclose articles mounted upon platform.

A further feature includes upon the undersurface of the platform a first pair of brackets adapted for removably securing the platform in an upright position with respect to one of the side frames and additional pairs of pivotal clips adjacent the sides thereof and adapted for anchoring the platform upon bottom portions of the side frames or alternately upon top portions of the side frames selectively.

These and other features and objects will be seen form the following Specification and claims in conjunction with the appended drawings.

THE DRAWINGS

Figure 5:
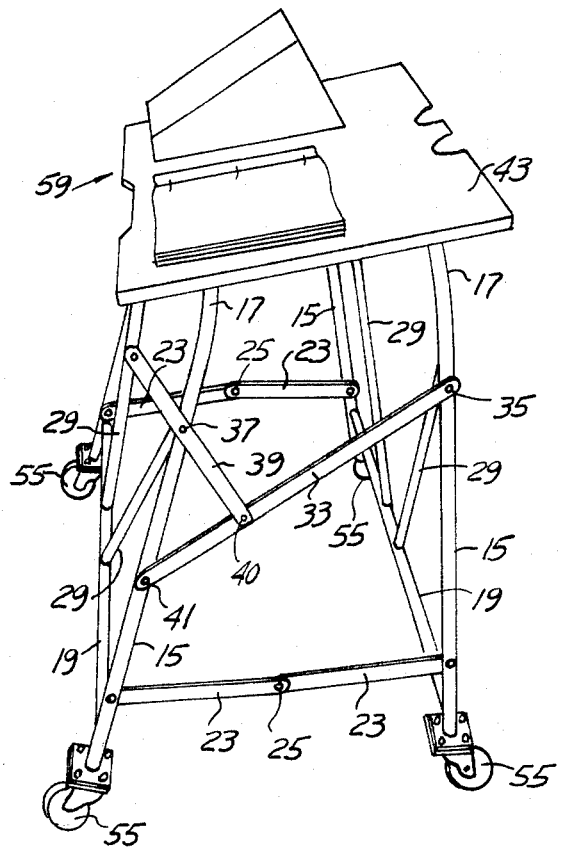

FIG. 5 an end perspective view thereof.

It will be understood that the above drawings illustrate merely a preferred embodiment of the invention and that other embodiments are contemplated within the scope of the claims hereafter set forth.

DETAILED DESCRIPTION OF AN EMBODIMENT OF THE INVENTION

Figure 1:
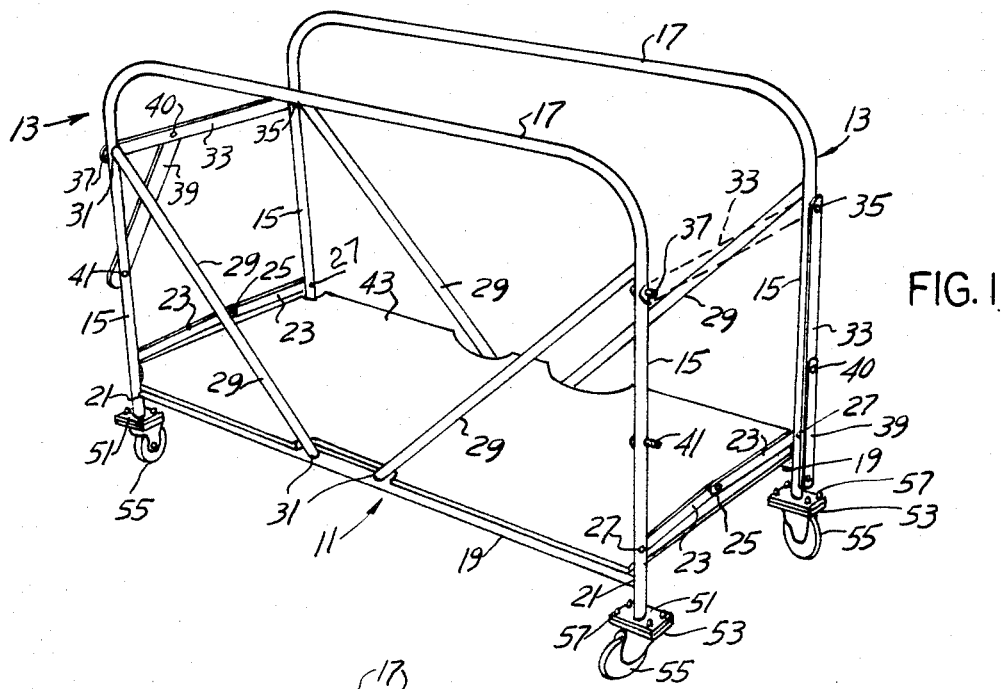
FIG. 1 is a front perspective view of a collapsible cart-stand.
Figure 2:
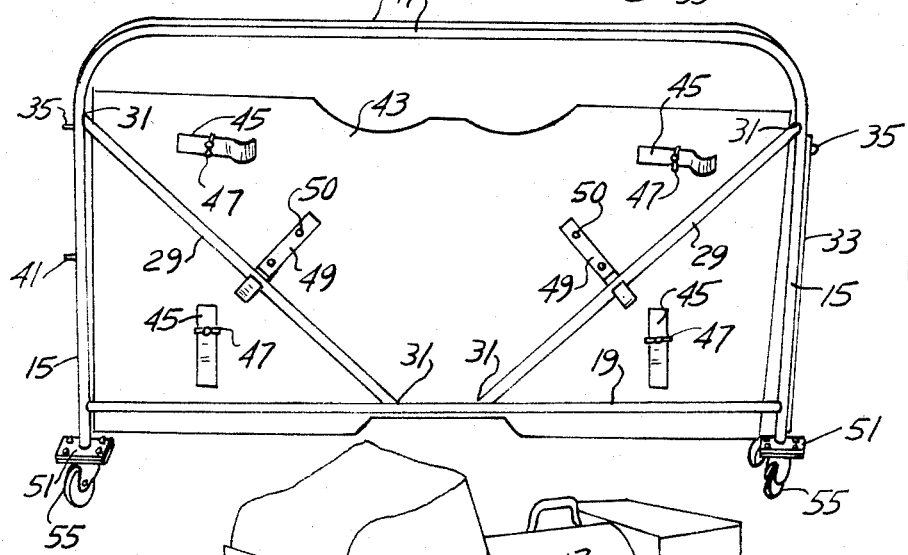
FIG. 2 is a side perspective view showing the cart-stand collapsed.
Figure 3:
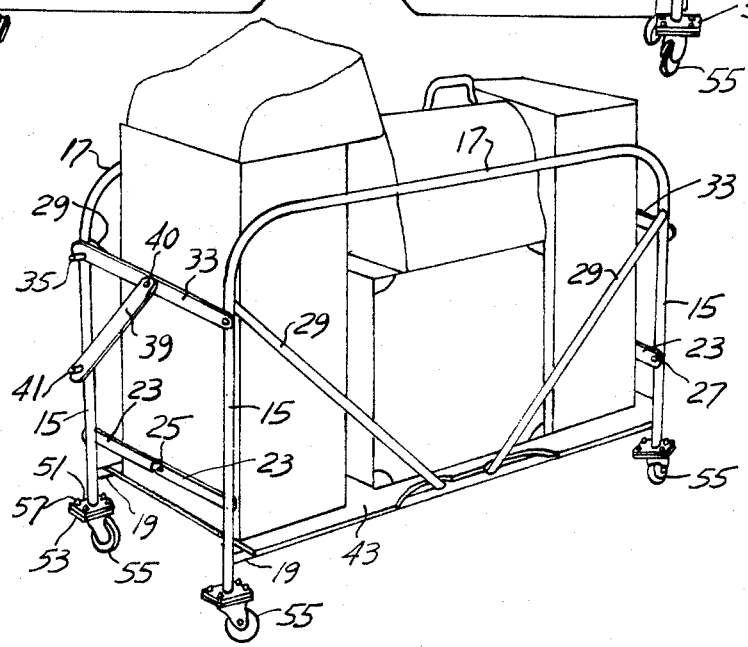
FIG. 3 is a front perspective view showing the cart-stand as loaded with articles.
Figure 4:
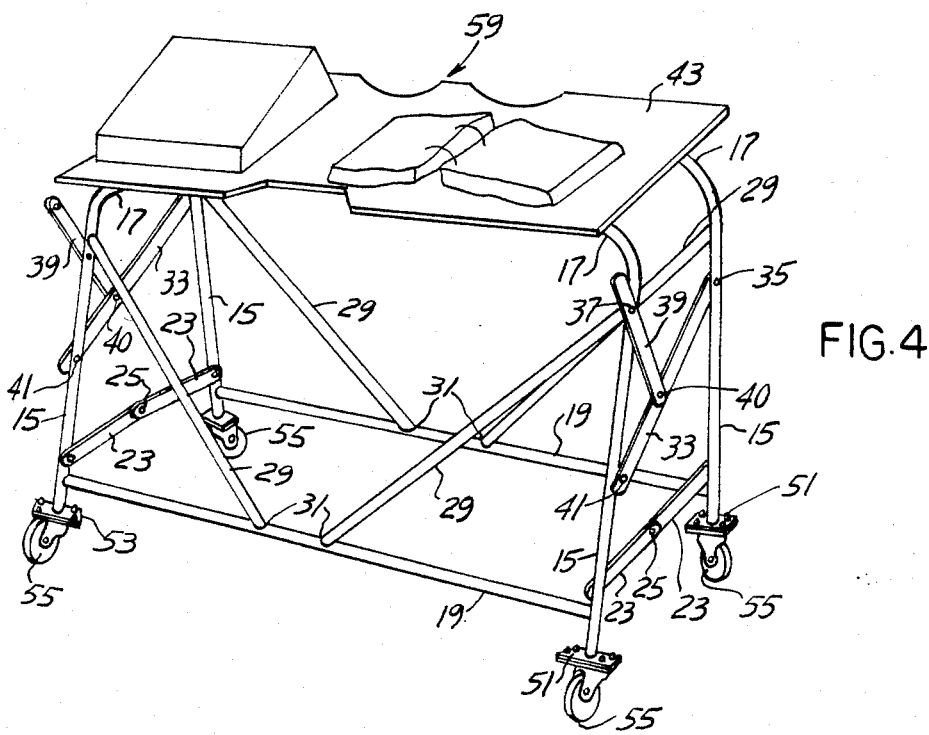
FIG. 4 is front perspective view of the cart-stand with the linkage and platforms changed to provide a bandstand support.

Present cart-stand 11, FIGS. 1, 2 and 3, which may be converted to a bandstand, a drafting board or like article, FIGS. 4 and 5, includes a pair of upright parallel spaced side frames 13 of D form. Each of the side frames includes upright end posts 15, top rod 17 interconnecting its upper ends, and a bottom support rod 19 interconnecting lower end portions thereof. The bottom support rods are suitably secured to the end posts 15 as by welding at 21.

Longitudinally spaced pairs of aligned foldable frame support links 23 are pivotally interconnected at 25 and at their outer ends are pivotally connected at 27 to lower end portions of the side frames, with the support links extending transversely of said side frames.

A pair of spaced upwardly and outwardly inclined diverging reinforcement tubes 29 at their lower ends are secured to the bottom support rod or tube 19 as by welds 31 and at their upper end are similarly secured to upper end portions of end posts 15 at 31, FIG. 2.

A pair of longitudinally spaced frame anchor links 33 at their one end are pivotally connected at 35 to upper end portions of one side frame 13, and at their other ends are removably connected at 37 to upper end portions of the other side frame. Anchor links 33 extend transversely of the respective side frames 13 and together with the opposed pairs of frame support links 23 provide a means of ridgidly interconnecting the respective side frames, FIGS. 1 and 2.

Reinforcing link 39 at one end is pivotally connected at 40 to an intermediate portion of anchor link 33 and at its opposite end is removably pivoted at 41 to one side frame, as a reinforcement and to assure the maintenance of the side frames 13 in parallel spaced relationship.

The elongated rectangular platform 43, in the nature of a shelf, spans and at its edges overlies the corresponding bottom support rods 19 of the respective side frames and is removably secured thereto. For this purpose there are provided upon the undersurface of platform 43 adjacent its opposite side edges, spaced pairs of clips 45. These are pivotally mounted upon the platform employing wing nuts 47 or other fastener. The respective clips 45 are adapted for rotation so as to extend transversely of the length of the platform and to retainingly engage the undersurface of the corresponding bottom support rods 19 of the respective side frames, in FIGS. 1, 2 and 3. The wing nuts are tightened to anchor the platform to tubes 19.

Also mounted upon the undersurface of the platform is a pair of spaced inclined brackets 49 secured thereto at 50, including yieldable end portions adapted for retaining engagement with the corresponding reinforcements 29 when the side frames are collapsed, FIG. 2, and the platform 43 disposed therebetween.

Each of the end posts 15 of the side frames at its lower end terminates at transverse end plate 51 secured thereto by welding. Mount plates 53 for the casters 55 underlie end plates 51 and are suitably secured thereto by fasteners 57.

The respective side frames including end posts 15, bottom support rods 19, top rods 17 and the reinforcements 29 are preferably of a tubular construction.

One of the anchor links 33 is shown disconnected from fastener 37 and collapsed, FIG. 1, to facilitate loading of the cart-stand. After loading the anchor link 33 at one end of the stand is rotated to its securing position transversely of the frames 13 and at its end connected at 37 to the second side frame. The corresponding reinforcing link 39 is further connected at 41 to the adjacent side frame.

While the present cart-stand may be collapsed, FIG. 2, upon removal of platform 43 and upon disconnection of the respective anchor links 33 and reinforcing links 39, the cart stand may also be modified or converted into a bandstand or drafting board or the like, as shown at 59, FIGS. 4 and 5.

In this condition, with platform 43 removed from the bottom support rods 19, the connections of the anchor links 33 between the respective side frames are modified. The other ends of the anchor links 33 are disconnected as at 37 from one of the side frames and at the same time the reinforcement link 39 is disconnected from its pivotal connection 41. Thereafter, anchor links 33 at their ends are connected to the intermediate pivotal connection 41, FIG. 5. At the same time an intermediate portion of reinforcement link 39 is connected as at 37 to an upport portion of the corresponding end posts 15.

With this modification of the anchor linkage 33, 39 from what is shown in FIG. 1 to what is shown in FIGS. 4 and 5, one of the side frames 13 is inclined at an acute angle with respect to the other side frame. At the same time the platform 43, removed from the lower support rods 19, spans and is mounted over the corresponding top rods or tubes 17 of the side frames and secured thereto by the corresponding clips 45, 47. In this arrangement, top platform 43 is inclined forwardly and downwardly at an acute angle for use as a bandstand or other device. It is considered equivalent that instead of a bandstand, there might be a drafting board or other inclined table support to which the present cart-stand can be converted.

Having described my invention, reference should now be had to the following claims:

I claim:

1. A collapsible cart-stand comprising a pair of parallel spaced upright side frames mounting casters at their lower ends;

longitudinally spaced pairs of aligned foldable frame support links at their inner ends pivotally connected and at their outer ends pivotally connected to lower end portions of said side frames and extending transversely thereof;

each side frame including a longitudinally extending bottom support rod interconnecting its lower ends;

a platform spanning said side frames and at its side overlying said support rods and removably secured thereto;

a pair of longitudinally spaced frame anchor links at their one ends pivotally connected to upper end portions of one side frame and at their other ends adjustably connected to upper end portions of the other side frame and extending transversely thereof;

said side frames upon removal of said platform and adjusting said other ends of said anchor links adapted for collapsing into parallel engaging registry, with said support links folded;

the securing of said platform to said support rods including longitudinally spaced opposed pairs of clips pivotally mounted upon the undersurface of said platform adjacent its sides, removably underlying and retainingly engaging said support rods respectively;

said platform adapted to snug upright positioning between said side frames when collapsed;

spaced anchor brackets upon the undersurface of said platform removably secured to one of said frames;

each side frame having a pair of upright ends posts and a top rod interconnecting said end posts;

and a pair of spaced diverging reinforcement rods at their one ends secured to said support rod and at their other ends secured to upper portions of said end posts, respectively;

said anchor brackets being secured to the reinforcement rods upon one of said side frames.

2. A collapsible cart-stand comprising a pair of parallel spaced upright side frames mounting casters at their lower ends;

longitudinally spaced pairs of aligned foldable frame support links at their inner ends pivotally connected and at their outer ends pivotally connected to lower end portions of said side frames and extending transversely thereof;

each side frame including a longitudinally extending bottom support rod interconnecting its lower ends;

a platform spanning said side frames and at its side overlying said support rods and removably secured thereto;

a pair of longitudinally spaced frame anchor links at their one ends pivotally connected to upper end portions of one side frame and at their other ends adjustably connected to upper end portions of the other side frame and extending transversely thereof;

said side frames upon removal of said platform and adjusting said other ends of said anchor links adapted for collapsing into parallel engaging registry, with said support links folded;

and a reinforcement link at one end pivotally connected to each anchor link respectively intermediate its ends, and at its other end removably secured to an intermediate connection on an adjacent side frame between its connections with said support and anchor links.

3. In the cart-stand of claim 2, on removal of said other ends of said anchor links from said other side frame and upon removal of the other ends of said reinforcement links from said intermediate connections, and reconnecting the other ends of said anchor links to said intermediate connections with a portion of said reinforcement links connected to said other side frame respectively, the adjacent side frame is inclined at an acute angle to said one frame, said platform being removable from said support rods and at its sides spanning said side frames and removably secured thereto, said platform being inclined downwardly towards said other side frame defining a bandstand or the like.

4. In the cart-stand of claim 3, each side frame having a pair of upright end posts and a top rod interconnecting said end posts;

said platform being removably secured to said top rods respectively.

5. In the cart-stand of claim 4, the securing of said platform to said top rods including longitudinally spaced opposed pairs of clips pivotally mounted upon the undersurface of said platform adjacent its sides removably secured to said top rods respectively.

* * * * *